Patented Sept. 15, 1942

2,295,963

UNITED STATES PATENT OFFICE 2,295,963

CONDENSATION PRODUCTS OF THE PYRENE SERIES

Heinrich Neresheimer and Anton Vilsmeier, Ludwigshafen-on-the-Rhine, Germany, assignors to General Aniline & Film Corporation, a corporation of Delaware No Drawing. Application September 1, 1938, Serial No. 227,986. In Germany September 4, 1937

7 Claims. (Cl. 260—359)

The present invention relates to condensation products of the pyrene series, a process of producing them and methods for their use.

We have found that condensation products of the pyrene series which are from liquid to solid, low-melting substances capable of being employed for various technical purposes are obtained by heating hydroxy derivatives of the pyrene series with high-molecular unsaturated hydrocarbons or alcohols, esters, mercaptans, ethers and thioethers in the presence of an acid condensing agent. By "pyrene series" in the specification and claims are meant such organic compounds, whose nuclear structure contains a pyrene ring system as illustrated by the examples shown herein. Such condensed ring systems as are usually designated "perylene" or which contain an entire perylene system are excluded. Instead of the hydroxy compounds of the pyrene series themselves there may be employed also compounds which behave as the same under the reaction conditions such as ketones of the pyrene series such as are present in the vat dyestuffs of the dibenzpyrenequinone series. Furthermore there may be employed as starting materials compounds which are capable of forming the pyrene ring under the reaction conditions. Thus for example by heating 1,1'-dinaphthyl-8,8'-dicarboxylic acid with dodecylbromide in the presence of zinc bromide a deep red colored oil is obtained which dissolves in organic liquids giving a yellow coloration and a vivid olive-blue fluorescence. The same compound is also obtained if the anthranthrone obtainable from the said 1,1'-dinaphthyl-8,8'-dicarboxylic acid by ring closure for example with concentrated sulphuric acid is used.

The condensation products obtainable in accordance with the present invention contain in their molecule, attached to the nucleus by way of a carbon to carbon linkage, alkyl groups having at least six carbon atoms, and they are from difficultly soluble to insoluble in cold sulphuric acid and not capable of being saponified with hot sulphuric acid yielding the initial material. They are, generally speaking, liquid or low melting solid substances which have an excellent solubility in organic liquids, especially in organic liquids free from oxygen such as hydrocarbons and particularly mineral oils and impart to them in most cases a remarkable coloration and a vivid fluorescence. They may therefore be employed for the purpose of coloring or for imparting fluorescence or both by incorporating them into organic liquids of the said kind or also into fats, waxes, paraffin waxes and artificial masses of various composition.

The following examples will further illustrate how our said invention may be carried out in practice but the invention is not restricted to these examples. The parts are by weight.

Example 1

A mixture of 50 parts of dodecyl bromide, 10 parts of pyranthrone and 10 parts of zinc chloride is heated at about 200° C., until the strong evolution of hydrogen bromide has ceased and the starting material is no longer present. The mixture is allowed to cool, diluted with benzene, freed from undissolved ingredients by filtration, the benzene is evaporated and the residue is washed wtih methanol, whereby a red oil is obtained which dissolves readily in organic liquids, for example in benzene, benzine, mineral oils, paraffin oil, fats and waxes giving a yellow coloration and imparting a powerful olive-green fluorescence to these substances.

If instead of dodecyl bromide dodecyl alcohol or dodecyl ether is employed and hydrogen chloride is led through the reaction mixture, the same compound is obtained. Other high-molecular alcohols, for example octadecyl alcohol, abietinol or mixtures thereof, may be employed too instead of dodecyl alcohol. For the reaction there may also be used the olefines corresponding to the high-molecular alcohols.

End products having very similar properties may be obtained by starting from dodecyl mercaptan or dodecyl sulphide instead of from dodecyl alcohol or dodecyl ether.

Example 2

A mixture of 50 parts of dodecyl bromide, 5 parts of 5',6'-phthaloyl-2-hydroxy-4,5,9,10-dibenzpyrene-3,8-quinone (obtainable according to the method described in the U. S. Patent No. 2,124,891) and 5 parts of zinc chloride is stirred at about 200° C. until the starting material is no longer present. Then the mixture is worked up as described in Example 1, whereby a brown-red oil is obtained which is readily soluble for example in paraffin oil giving a yellow coloration and an olive fluorescence.

Example 3

A mixture of 100 parts of dodecyl bromide, 10 parts of 4,5,9,10-dibenzpyrene-3,8-quinone and 10 parts of zinc dust is heated while well stirring at about 200° C., whereby a vigorous reaction takes place while hydrogen bromide evolves.

Heating is continued until hydrogen bromide no longer evolves, the mixture is then allowed to cool, diluted with benzene and worked up according to Example 1. A deep red colored oil is thus obtained in an excellent yield. It dissolves very readily in paraffin oil giving a yellow coloration and a bluish olive fluorescence.

*Example 4*

A mixture of 100 parts of dodecyl bromide, 10 parts of anthanthrone and 10 parts of zinc dust is stirred at from about 200 to 220° C. until the starting material has disappeared and the vigorous evolution of hydrogen bromide has ceased. There is worked up according to Example 1 and there is obtained in an excellent yield a deep red oil being also movable when cold. It is very readily soluble in benzene, benzine, paraffin oil, mineral oils and other similar substances and imparts them a powerful olive-blue fluorescence.

Instead of zinc dust which yields under the conditions described by reaction with dodecyl bromide zinc bromide, zinc bromide or also zinc chloride itself may be employed as acid condensing agent.

By starting from 1,1'-dinaphthyl-8,8'-dicarboxylic acid instead of from anthanthrone the same end product is obtained.

*Example 5*

A mixture of 50 parts of dodecyl bromide, 5 parts of 3,5-dihydroxypyrene and 5 parts of zinc chloride is stirred at about 200° C., until no starting material is detectable. The mixture is then allowed to cool and worked up according to Example 1. A brown-red oil is obtained which is readily soluble in paraffin oil giving a yellow coloration and an olive-green fluorescence.

What we claim is:

1. A process of producing a condensation product of the pyrene series which comprises heating a compound of the pyrene series having hydroxyl groups directly attached to the nucleus with an alkyl halide containing at least 6 carbon atoms in the presence of an acid condensing agent.

2. The process as defined in claim 1, wherein the acid condensing agent is zinc chloride.

3. The process as defined in claim 1, wherein the alkyl halide is formed in situ by the reaction of an aliphatic alcohol containing at least 6 carbon atoms with hydrogen chloride.

4. The process as defined in claim 1, wherein the alkyl halide is formed in situ by the reaction of an aliphatic ether having at least 6 carbon atoms with hydrogen chloride.

5. A high molecular from oily to solid low melting condensation product obtained according to the method of claim 1.

6. A process of producing a condensation product of the pyrene series which comprises heating anthanthrone with dodecyl bromide in the presence of zinc chloride.

7. A high molecular condensation product obtained according to the process claimed in claim 6, said condensation product containing in its molecule attached to the nucleus by way of a carbon to carbon linkage dodecyl groups, the said condensation product being a deep red oil which dissolves very readily in hydrocarbons and mineral oils, the solution being from red to yellow depending on the concentration and imparting to the said hydrocarbons a powerful olive-blue fluorescence.

HEINRICH NERESHEIMER.
ANTON VILSMEIER.